Figure 1:
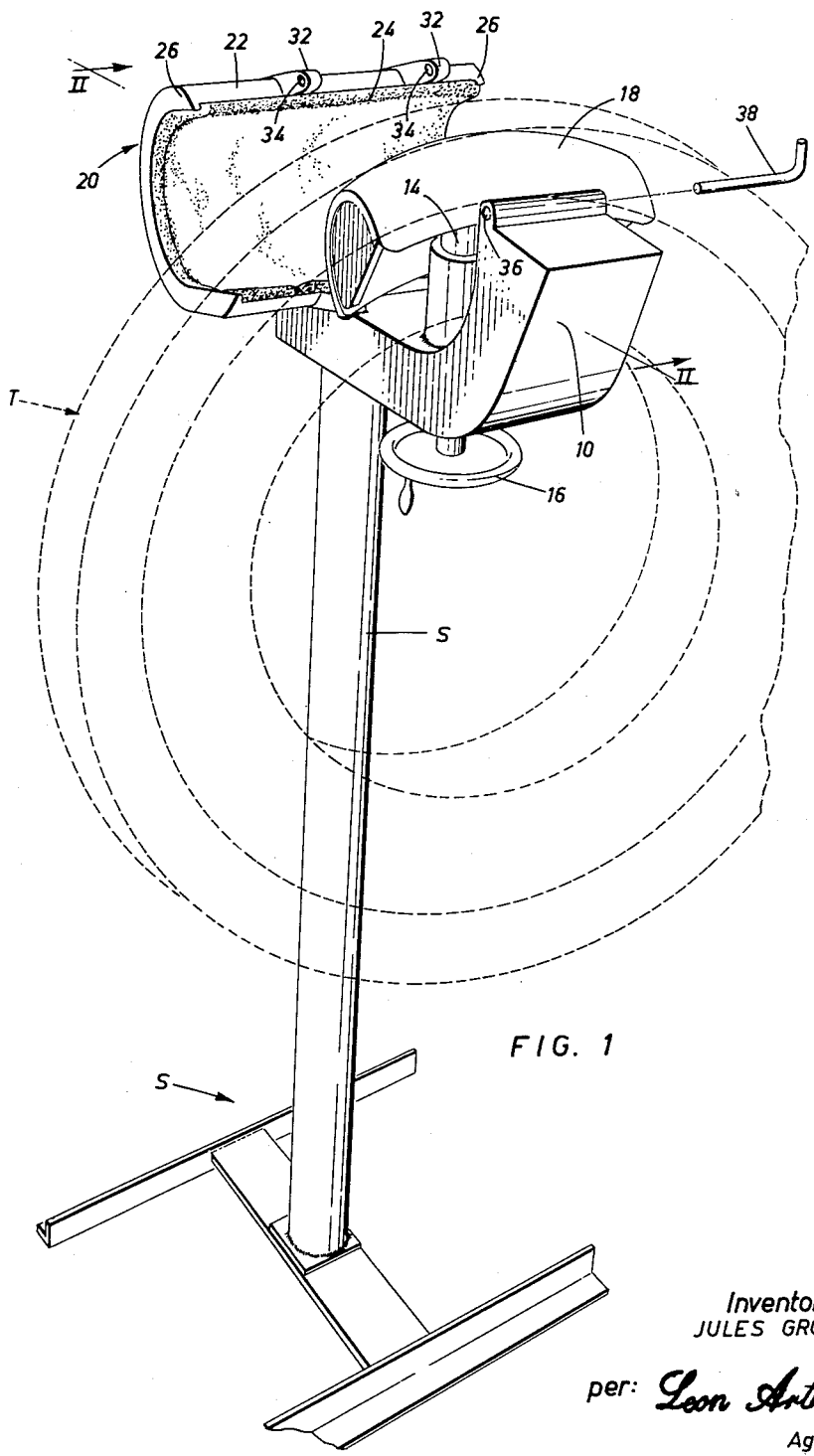

Inventor
JULES GROSS per: Leon Arthurs
Agent

Oct. 10, 1961  J. GROSS  3,003,377
TIRE PATCH APPLYING MACHINE
Filed Oct. 30, 1958  2 Sheets-Sheet 2

Inventor
JULES GROSS per: *Leon Arthurs*
Agent

3,003,377
TIRE PATCH APPLYING MACHINE
Jules Gross, 34 Glencedar Road, Toronto,
Ontario, Canada
Filed Oct. 30, 1958, Ser. No. 770,645
3 Claims. (Cl. 81—15.2)

The invention relates to apparatus for use in repairing tire casing and, in particular, to apparatus for making local or "spot" repairs wherein the specific segment of the tire undergoing repair is sandwiched and compressed between two pressure devices; a repair patch and heat source being included in the "sandwich" although such patch and heat source are not, properly speaking, part of the apparatus in question.

One of the more important problems affecting tire repairs as herein visualized is the distortion of the said tire casing occurring in the repair thereof; distortion being particularly deleterious to the repair and having a serious effect on the riding qualities of the repaired tire especially if it be of the modern low pressure type. Machines are, of course, available for effecting such repairs with little or no significant distortion but such machines are generally too complicated both in structure and in use, and hence too expensive for the average automobile service station.

The principal objects of the invention are therefore to provide such apparatus which is economical to make, simple to operate, efficient in use and, in particular, wherein distortion of tire casings consequent upon repair is confined to a relatively low degree.

Another important feature and object of the invention is also, its adaptability to effect relatively distortion-free repairs on tires of all common sizes.

A particular feature and object of the invention is the provision of apparatus of the contemplated character in which the positioning and orientation of the tire for repair thereof may be accomplished without special means for gripping and holding the tire; such means being consequently eliminated from the apparatus to the advantage of the latter from the viewpoint of economy and convenience.

A further object of the invention is the provision of such apparatus which is capable of engaging a repair site in any position on the tire casing without special means for re-orienting the pressure devices for each individual repair; such means also being eliminated to the advantage of the apparatus.

It is a still more particular object of the invention to provide such apparatus having facilities enabling the tire casing to be supported in a perpendicularly dependent position during the repair operation.

The invention seeks to procure the foregoing and other, more or less obvious advantages by providing apparatus for repairing tire casings comprising a rigid mandrel and a yielding hood arranged to releasably sandwich a segment of a tire casing therebetween, said mandrel conforming to and being adapted to engage the interior of at least the whole of the crown and one sidewall of said tire segment, said hood being disposable around said tire casing and responsive to fluid pressure to conformingly engage the exterior of at least the whole of said crown and sidewall and to transmit substantially uniform pressure thereto compressing said crown and sidewall against said mandrel.

Figure 2:
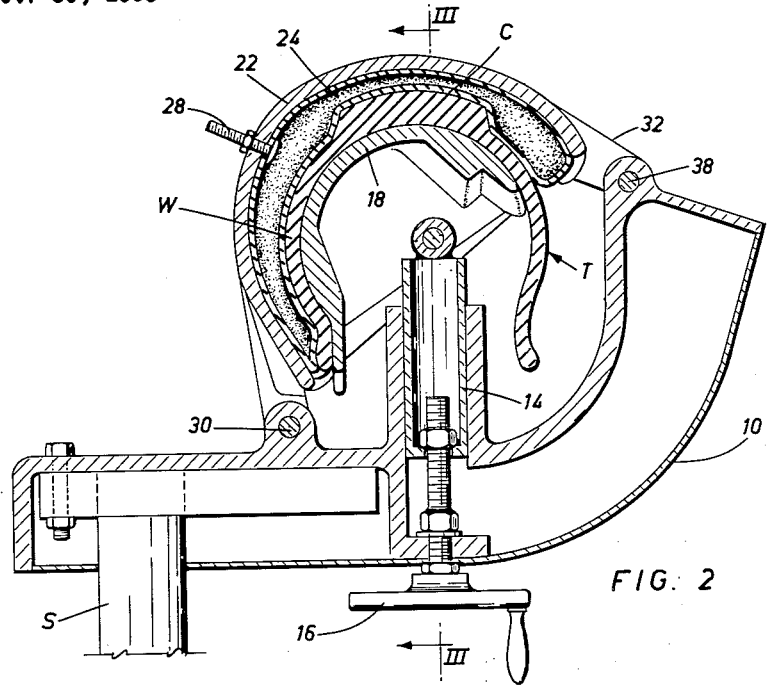
Figure 3:
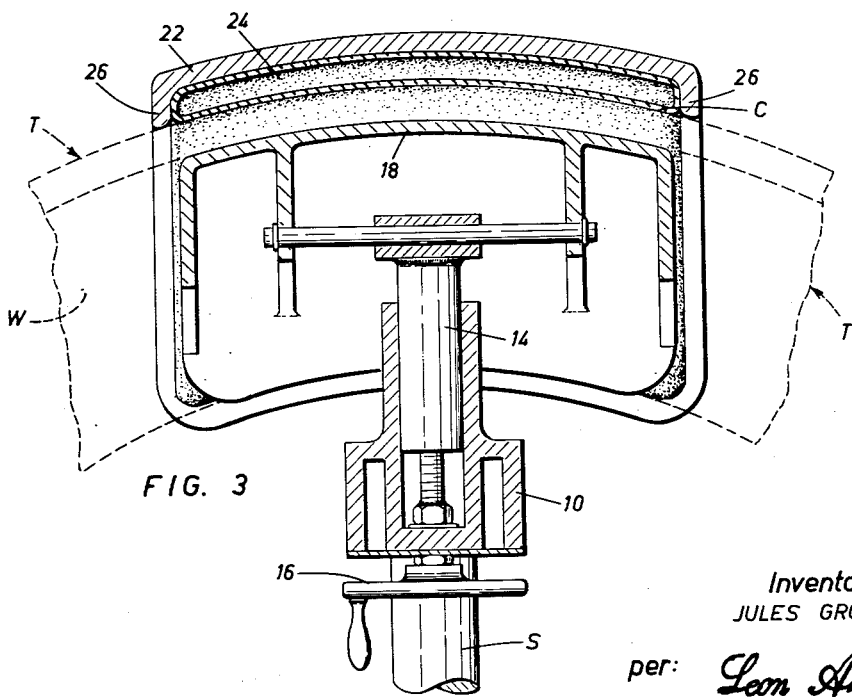

A preferred form of the invention will now be described by way of example only with reference to the following drawings, in which like reference devices refer to like parts thereof throughout the various views and diagrams, and in which:

FIG. 1 is a perspective view of the complete apparatus, with a tire in position for repair on the mandrel being shown in ghost form, the yielding hood being shown in a raised or released position for clarity, FIG. 2 is an enlarged sectional view of the apparatus along the line 2—2 of FIG. 1, omitting the floor-stand, the yielding hood being here shown disposed around the tire, which is here shown in solid lines, and FIG. 3 is an enlarged sectional view of the apparatus along the line 3—3 of FIG. 2 omitting the floor-stand, the tire being shown in ghost form once more.

Referring now to FIG. 1, the present exemplary embodiment of the invention is there shown to consist of a substantially L-shaped cantilever arm 10 supported at an elevation, as for example on the floor-stand S, in a horizontal position with its end portion turned upwardly. Approximately midway along the arm 10 is located the pillar 14 which is vertically adjustable, as by screw 16, to a limited degree, the purpose of which is to be hereinafter described, and on which the mandrel 18 is mounted. The mandrel 18 is a rigid member, the function of which is twofold. In the first place, it is to be receivable within the interior of a tire casing, such as T shown in ghost form in FIG. 1, to engage the inner surface of the portion of the tire casing T being repaired. In the second place, it also functions to support the whole tire casing T in position while it is being repaired. In order to perform both of these functions satisfactorily it is made to conform both in length and in contour to the interior of at least the whole of the crown C and one side-wall W of a segment of the tire casing T and is receivable within the tire casing T to engage the interior of said crown and side-wall simultaneously when the said casing T is arranged in a perpendicularly dependent position thereon.

For the purpose of providing support for the tire casing T the mandrel 18 is mounted in a fixed orientation with its crown-engaging portion (i.e. the portion thereof which is shaped to conform to and engage the interior of the crown of said tire segment) facing uppermost, and is itself supported, as by the stand S in this particular example, at an elevation permitting the tire casing T to depend freely therefrom without encountering any obstruction from the other parts of the apparatus.

From the foregoing it will be seen that by providing a mandrel 18 large enough to engage both the crown and one side-wall of a casing in this way it can engage a repair site in any position in the tire casing T, whether in the crown C or in either of the sidewalls W, by merely placing the tire casing T over it and without any need for specially orienting the mandrel 18 for each repair. As a result there is no need for the provision of means for adjustment of the orientation of the mandrel 18, thus reducing the cost of the machine and the time required for effecting a repair. A further advantage stemming from the size and fixed perpendicular orientation of the mandrel 18 is that it supports the tire casing T during the repair operation thus doing away with the necessity of complicated support means and further reducing the initial cost and repair time.

A still further advantage stemming at least partly from the size and shape of the mandrel 18 is that a large area of the tire casing T around the repair is firmly supported throughout the repair operation and is maintained substantially in its normal or original shape. This wide support is instrumental in preventing or reducing distortion of the casing at or around the repair with consequent gains in the riding qualities of the repaired tire casing.

The mandrel 18 is shaped to conform to an average of a range of tire sizes, and the scope of the apparatus may be expanded by providing a few alternative mandrels 18 conforming to different size ranges. The mandrel 18 shown is removably mounted on the pillar 14 for the purpose of interchanging one such mandrel 18 with another.

Also carried by the arm 10, supported on the stand S, is the yielding hood 20 which comprises the shell 22, containing within it the inflatable bladder 24. The shell 22 is a rigid member made in a generally concave shape conforming generally both in length and contour to the proportions of the exterior of at least the whole of the crown C and one side-wall W of the segment of the tire casing T and having dependent flanges 26—26 formed on either side thereof conforming generally to the contours of the said tire casing T. Contained within the shell 22 is the inflatable bladder 24 which may be connected to a compressed air supply as by nipple 28 projecting through the shell 22. The shell 22 is hingedly mounted by one end on the arm 10 by the hinge 30 for swinging to embrace and release the segment of the tire casing T disposed on the mandrel 18. The other or free end of the shell 22 is provided with extensions 32—32 having holes 34—34 formed therein and which co-operate with the keyway 36 formed at the upwardly turned end of the arm 10 enabling the insertion of a bolt 38 therethrough thereby locking the hood 20 in position around the tire casing T.

From FIGS. 2 and 3 it will be seen that shell 22 is shaped to provide a substantial space between itself and the crown C and sidewall W of tire T for carrying and containing bladder 24 secured therewithin and providing adequate room for expansion thereof against crown C and sidewall W. Furthermore it will be seen that the concave shape of shell 22 is such that its edge or perimeter conforms relatively closely to the crown C and sidewall W of tire T for enclosing and retaining bladder 24 therewithin, even engaging or contacting the tire T in places, as for example, at flanges 26—26 (as shown in FIG. 3).

In operation the damaged portion of the tire casing T is placed over and in engagement with the mandrel 18 which should be at its lowest position together with conventional heating means and a patch (not shown). The hood 20 is next swung over the exterior of the tire casing T and locked in such position by the bolt 38 and the mandrel 18 is then raised to the correct height by operation of the screw 16 to bring the tire casing T to the correct distance from the hood 20. Compressed air is then supplied to the bladder 24 which is thereby expanded to apply substantially uniform pressure over the whole of the crown C and the side-wall W of the said segment of the tire casing T which is engaged thereby, conformation of the bladder 24 to the exterior surface thereof occurring automatically while the bladder 24 is confined and retained against excessive outward expansion by shell 22 and flanges 26—26. Heat is then applied to the repair by well-known means and vulcanization proceeds in the conventional manner, after which the pressure may be released, the hood 20 raised, and the tire casing T removed from the mandrel 18. It will be observed that the only adjustment necessary in the foregoing operation is to raise the height of the mandrel 18 to enable the hood 20 to fit over the tire casing T as closely as possible. The shape of the mandrel 18 and hood 20 are particularly emphasized because, as already stated, the apparatus is thereby enabled to effect a repair in any position on a tire casing, whether in the crown or in either of its side-walls, without the necessity for re-aligning the mandrel 18 and the hood 20 to suit each particular repair. The novel shape of the mandrel 18 further enables the apparatus to support the tire casing in a perpendicularly dependent position without the need for providing any special support means, thereby reducing the cost of the apparatus and the number of operations required to effect a repair.

In addition to these advantages in manufacturing and operating costs however, which are, of course, important to prospective purchasers of such apparatus, a significant advantage stemming from this novel construction lies in its ability to make relatively distortion-free repairs. As stated above, this is partially dependant upon the use of a mandrel 18 of considerable size providing support to a wide area of the tire casing around the repair, but also it is dependent upon the construction of the hood 20 which is capable of applying substantially uniform pressure over the whole of the segment of the tire casing engaged thereby, irrespective of its particular configuration or state of wear. In this way sufficient pressure can be applied to effect a satisfactory repair without applying pressure in such a way as might be likely to lead to some kind of distortion. Unless a separate mandrel 18 is used for each individual tire size, which is clearly impracticable from the view point of economy, a very limited degree of distortion may possibly result from any lack of conformation there may be between the mandrel 18 and the particular tire being repaired. This will be practically harmless to the tire however because it will be spread over a substantial area of the segment being sandwiched, and this will be eliminated when the tire is replaced on the wheel and inflated.

The foregoing description is of a preferred embodiment of the invention and is by way of example only. It is not thereby intended to limit the invention to such embodiment and the claims are intended to include any alterations or modifications of the invention as come within the spirit thereof.

What I claim as my invention is:

1. Apparatus for repairing tire casings comprising an elongated rigid mandrel conforming to and adapted to engage the interior of at least the whole of the crown and one sidewall of a segment of said tire casing, means supporting said mandrel in a fixed orientation in a position to be received within said tire segment and to support said tire casing in a perpendicularly dependent position, an elongated hood hingedly mounted on said supporting means at one side of said mandrel so as to be swingable between a first position away from said mandrel to permit a tire segment to be mounted on or removed therefrom and a second position in operative relation to said mandrel and in which it closely embraces the crown and sidewall of a said segment mounted on said mandrel, and means for locking said hood in said second position; said hood comprising a rigid shell hingedly mounted on said means supporting said mandrel for swinging over said tire segment on said mandrel, said shell being of generally concave shape for conforming approximately to the exterior of said crown and sidewall of said tire segment, and an inflatable bladder secured to and entirely contained within said shell and being expandable in response to fluid pressure to conformingly engage the exterior of at least the whole of said crown and sidewall of said tire segment and to transmit uniform pressure thereto compressing said crown and sidewall against said mandrel; said shell being shaped to co-operate with said tire segment in said second position to provide an enclosed space sufficient for containing and retaining said bladder therewithin and inflating means extending from said bladder through said rigid shell.

2. The apparatus set forth in claim 1 including at least one flange depending from an edge of said shell and conforming relatively closely to said tire segment.

3. The apparatus set forth in claim 1 including means for adjustably raising and lowering said mandrel relative to said hood.

References Cited in the file of this patent
UNITED STATES PATENTS

| | | |
|---|---|---|
| 1,559,972 | Midgley | Nov. 3, 1925 |
| 1,630,815 | Wheelock | May 31, 1927 |
| 1,637,879 | Semler | Aug. 2, 1927 |
| 1,707,794 | Blaker | Apr. 2, 1929 |
| 2,322,962 | Dickson et al. | June 29, 1943 |
| 2,347,952 | James | May 2, 1944 |
| 2,442,499 | Kraft | June 1, 1948 |